United States Patent
Arnold et al.

(10) Patent No.: US 10,443,893 B2
(45) Date of Patent: *Oct. 15, 2019

(54) HINGE APPARATUS

(71) Applicant: Harsco Technologies LLC, Fairmont, MN (US)

(72) Inventors: Robert H. Arnold, Bethlehem, PA (US); Steven Moyer, Stroudsburg, PA (US)

(73) Assignee: Harsco Technologies LLC, Fairmont, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/018,572

(22) Filed: Jun. 26, 2018

(65) Prior Publication Data

US 2018/0372375 A1 Dec. 27, 2018

Related U.S. Application Data

(63) Continuation of application No. 14/976,999, filed on Dec. 21, 2015, now Pat. No. 10,030,890.

(60) Provisional application No. 62/095,092, filed on Dec. 22, 2014.

(51) Int. Cl.
| | | |
|---|---|---|
| G09F 7/22 | (2006.01) |
| F16M 13/02 | (2006.01) |
| F24H 9/00 | (2006.01) |
| F24H 9/02 | (2006.01) |
| F24H 9/20 | (2006.01) |
| G09F 7/18 | (2006.01) |
| F23M 7/00 | (2006.01) |
| E05D 3/00 | (2006.01) |
| E05D 3/06 | (2006.01) |
| E05D 11/10 | (2006.01) |

(52) U.S. Cl.
CPC .................. F24H 9/02 (2013.01); F24H 9/20 (2013.01); *E05D 3/06* (2013.01); *E05D 11/1014* (2013.01); *F16M 13/02* (2013.01); *F23M 7/00* (2013.01); *G09F 7/18* (2013.01); *G09F 7/22* (2013.01)

(58) Field of Classification Search
CPC .... F24H 9/02; F24H 9/20; F23M 7/00; G09F 7/20; G09F 7/18; G09F 7/22; E05F 3/20; F16M 13/02; E05D 11/1014; E05D 3/06
USPC ......... 248/27.1; 49/104, 371, 373, 381, 394, 49/463, 464; 16/293, 302, 307, 335, 379, 16/221; 110/173 R; 126/190
See application file for complete search history.

(56) References Cited

U.S. PATENT DOCUMENTS

| | | | |
|---|---|---|---|
| 2,571,070 A | 10/1951 | Simon | |
| 2,584,404 A | 2/1952 | Webb | |
| 2,750,185 A * | 6/1956 | Moore | E05F 1/1016 16/307 |
| 3,785,006 A | 1/1974 | Metz | |
| 4,163,440 A | 8/1979 | Stultz | |
| 4,527,835 A * | 7/1985 | Barnett | B60R 22/22 297/468 |
| 4,962,567 A * | 10/1990 | Dixon | E05D 11/082 16/319 |

(Continued)

*Primary Examiner* — Tan Le

(57) ABSTRACT

A hinge apparatus comprising structure to support a user interface incorporated into the cabinet housing of an electromechanical system for improved viewing and interaction with the user interface when the cabinet housing is opened during technician service, while simultaneously not obstructing access to the cabinet interior.

20 Claims, 16 Drawing Sheets

(56) References Cited

U.S. PATENT DOCUMENTS

| | | | | |
|---|---|---|---|---|
| 6,079,081 A | * | 6/2000 | Padiak | G09F 7/18 16/321 |
| 9,021,744 B2 | | 5/2015 | Kirkpatrick | |
| 9,909,354 B1 | * | 3/2018 | Kirkpatrick | E06B 3/5054 |
| 10,030,890 B2 | * | 7/2018 | Arnold | F24H 9/02 |

* cited by examiner

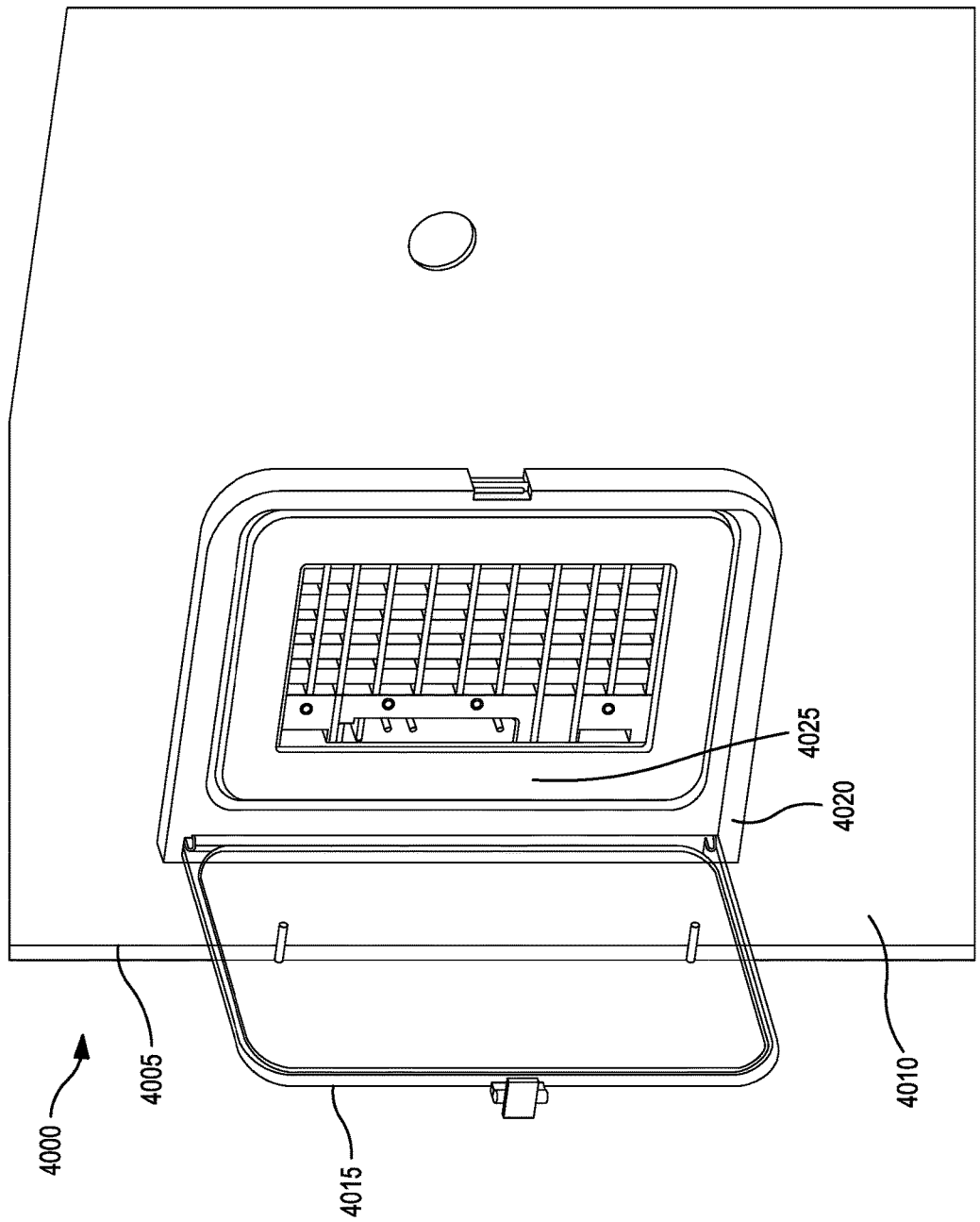

HINGE APPARATUS

CROSS-REFERENCE TO RELATED APPLICATIONS

This application is a continuation of U.S. patent application Ser. No. 14/976,999, filed Dec. 21, 2015, which claims the benefit of U.S. Provisional Application No. 62/095,092, filed Dec. 22, 2014, the contents of which are incorporated herein by reference in their entirety for teachings of additional or alternative details, features, and/or technical background, and priority is asserted from such.

BACKGROUND OF THE INVENTION

Field of the Invention

The present invention generally relates to a hinge apparatus for a user interface of an electro-mechanical system, such a hinge apparatus as (without limitation) might be constructed to hingedly support a user interface on a system for improved use of the user interface during all aspects of operation, testing and service.

Description of the Related Art

Electro-mechanical systems, such as boilers, and hot water heaters, invariably have some measure to control the system. Typically, the system will have a local user interface, supported by a support structure, within the system to program and/or operate the system. For example, a boiler system may have a local user interface mounted, via a support structure, to the boiler even if control of the system can be remotely operated, such as over a network. A user interface was typically installed on the face of the system cabinet. Likewise, a user display might be mounted on the system cabinet to indicate current operating conditions or parameters on the system. Alternatively, the user interface may be accessible through a window provided in the cabinet with the user interface accommodated within and among the internal components of the cabinet.

During servicing, testing and installation, however, the user interface cannot be accessible concurrently with the system cabinet open during such servicing, testing or installation. Furthermore, interfaces accommodated within and among the internal components of the cabinet hamper the service, testing and installation, requiring the control interface to be moved aside and or not accessible concurrently with the operations being performed during the servicing, testing, or installation. Not having both physical and visual interaction with the user interface during servicing, testing and installation of the electro-mechanical components within the cabinet, while being hampered by obstruction of the internal components of the systems enclosure by the user interface and associated support structure increases the time and burden of performing the intended operations. Prior user interface support structures failed in this respect to accommodate a technician's need access the internal components of a system cabinet without obstruction, while concurrently providing unencumbered access to the user interface while performing service, testing or installation. Until now, no prior attempts have been made to incorporate an articulated hinge apparatus as the support structure for a user interface within a electro-mechanical system. The hinge apparatus disclosed herein resolves these difficulties.

SUMMARY OF THE INVENTION

There is disclosed herein one or more exemplary embodiments of a hinge apparatus for mounting a user interface to an electro-mechanical system cabinet. The hinge apparatus may comprise a base frame fastened to the electro-mechanical system cabinet; and an interface frame hingedly mounted to the base frame, wherein the user interface is affixed to the interface frame and the hinge apparatus can allow unobstructed access to the electro-mechanical system cabinet. The exemplary embodiment may further comprise alternative configurations such as wherein the interface frame is rotatably positioned in a closed position for operational use, or the interface frame is rotatably positioned in an open position for servicing said electro-mechanical system. The hinge apparatus may further be configured wherein the open position of the interface frame allows concurrent interaction with the user interface and each of a plurality of internal components within the electro-mechanical system cabinet. The base frame may comprise an upper hinge pin and a lower hinge pin. In a further embodiment the interface frame can be removable from the base frame. An interface frame may be hingedly mounted to the base frame in a left-swing orientation or the interface frame can be hingedly mounted to the base frame in a right-swing orientation.

The base frame in an embodiment may comprise one or more locating hole and/or the interface frame may comprise a locating pin corresponding to one or more locating holes in the base frame. The hinge apparatus in a further exemplary embodiment may comprise an interface frame comprising a locating pin corresponding to one or more locating holes in the base frame and one of the one or more holes is associated with a fully open position. In addition, the fully open position may coincide with a substantially 180 degree angle between the interface frame and said base frame. The substantially 180 degree angle between the interface frame and said base frame may allows an operator to concurrently interact with the user interface and each of a plurality of components internal to the electro-mechanical system cabinet.

In an exemplary embodiment, the base frame of the hinge apparatus may comprise a release pin receiving hole. The embodiment may further comprise an interface frame comprising a release pin corresponding to a release pin receiving hole in the base frame, whereby alignment of the release pin with the release pin receiving hole coincides with a locked position of the hinge apparatus. The base frame of an exemplary embodiment of the hinge apparatus may comprise two affixed hinge pins, and the interface frame may comprise two hinge pin receiving holes for hingedly mounting the interface frame; and the interface frame may comprises a release pin distal to one of said two hinge pin receiving holes.

The hinge apparatus of an exemplary embodiment may comprise a base frame comprising two vertical members for fastening the base frame to the electro-mechanical system cabinet. Material for fabricating the base frame and the interface frame may be chosen from the group comprising: metal, plastic, and composite.

An upper portion and a lower portion of said interface frame of a hinge apparatus may reside above a coinciding upper portion and lower portion of said base frame. In one embodiment the electro-mechanical system comprising a hinge apparatus may be a boiler system or a hot water heater system.

In an alternative exemplary embodiment, a hinge apparatus for mounting a user interface to a electro-mechanical system cabinet door may comprise a base frame, wherein the base frame may comprise two vertical members for fastening the hinge apparatus to the electro-mechanical cabinet door, an upper hinge pin, and a lower hinge pin each affixed to the base frame, one or more locating pin receiving holes circumferentially positioned about the upper hinge pin, a release pin affixed to a bottom portion of the base frame; and an interface frame comprising an upper hinge pin receiving hole and a lower hinge pin receiving hole to hingedly mount the interface frame to the base frame, a release pin receiving hole fabricated into an upper portion of the interface frame and distal to the upper hinge pin receiving hole, wherein the user interface may be affixed to the interface frame and the hinge apparatus allowing concurrent and unobstructed access to the electro-mechanical system cabinet internal component while interacting with said user interface.

BRIEF DESCRIPTIONS OF DRAWINGS

Figure 2A:
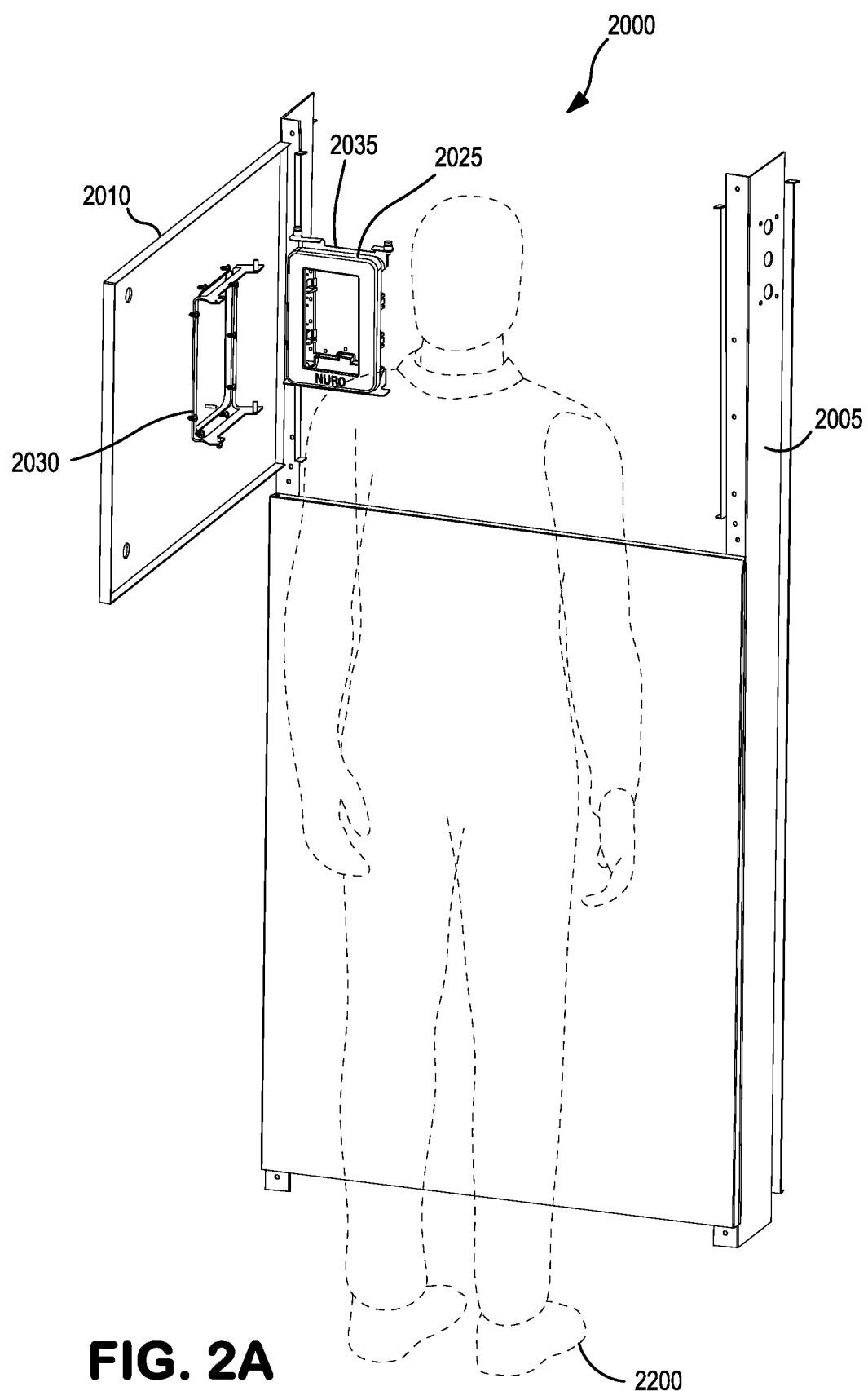
FIG. 2A is an isometric view depicting an exemplary embodiment of an articulated hinge apparatus, such as shown in FIG. 1, separated into its mounting frame and interface frame with their respective mounting to the cabinet door and mounting to the user interface enclosure, whereby a representation of a human form is shown for scale.
Figure 2B:
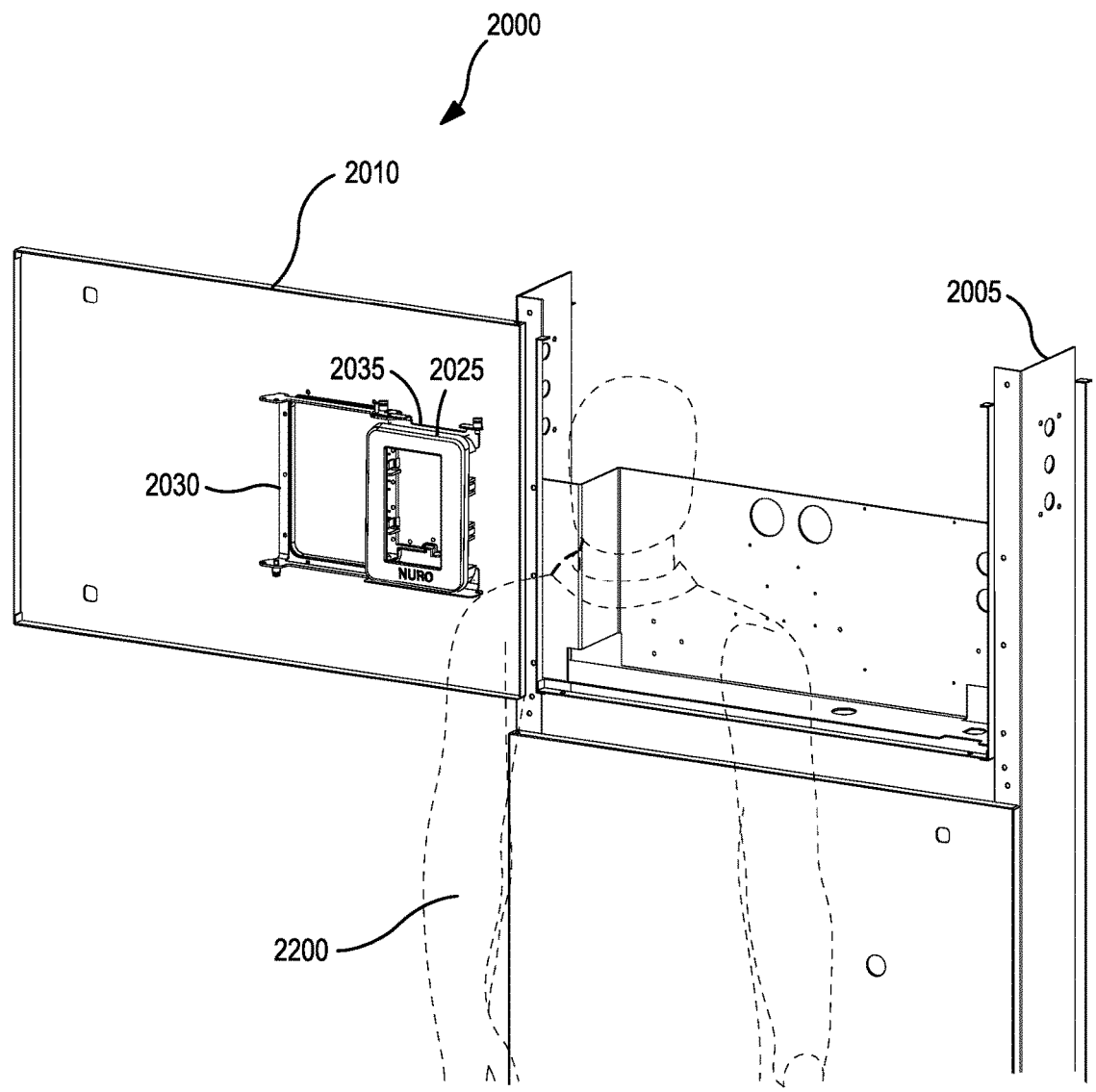

FIG. 2B is an isometric view depicting a close up of an exemplary embodiment of an articulated hinge apparatus mounted to an open cabinet door, such as shown in FIG. 2A, whereby an interface frame, and user interface enclosure to house a user interface, is rotated about its hinge pins at approximately one hundred and eighty degrees to provide a representative human, access to manipulate the machine internal components while monitoring and interfacing with the user interface.

Figure 3A:
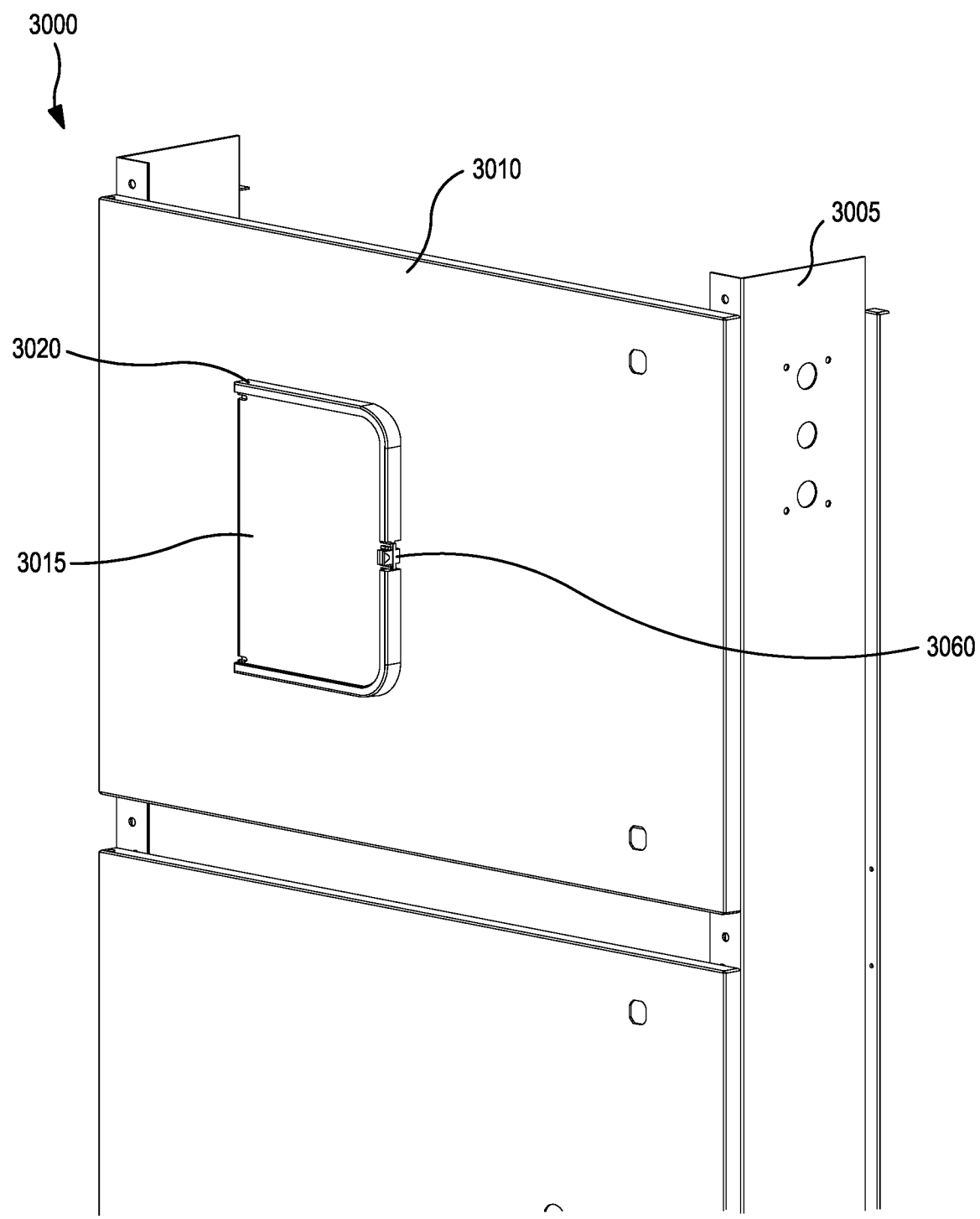

FIG. 3A is an isometric view depicting an exemplary embodiment of a mechanical system cabinet with a user interface protective access cover and associated surround that provides access to a user interface, for the mechanical system, and supported by an articulated hinge apparatus.

Figure 3B:
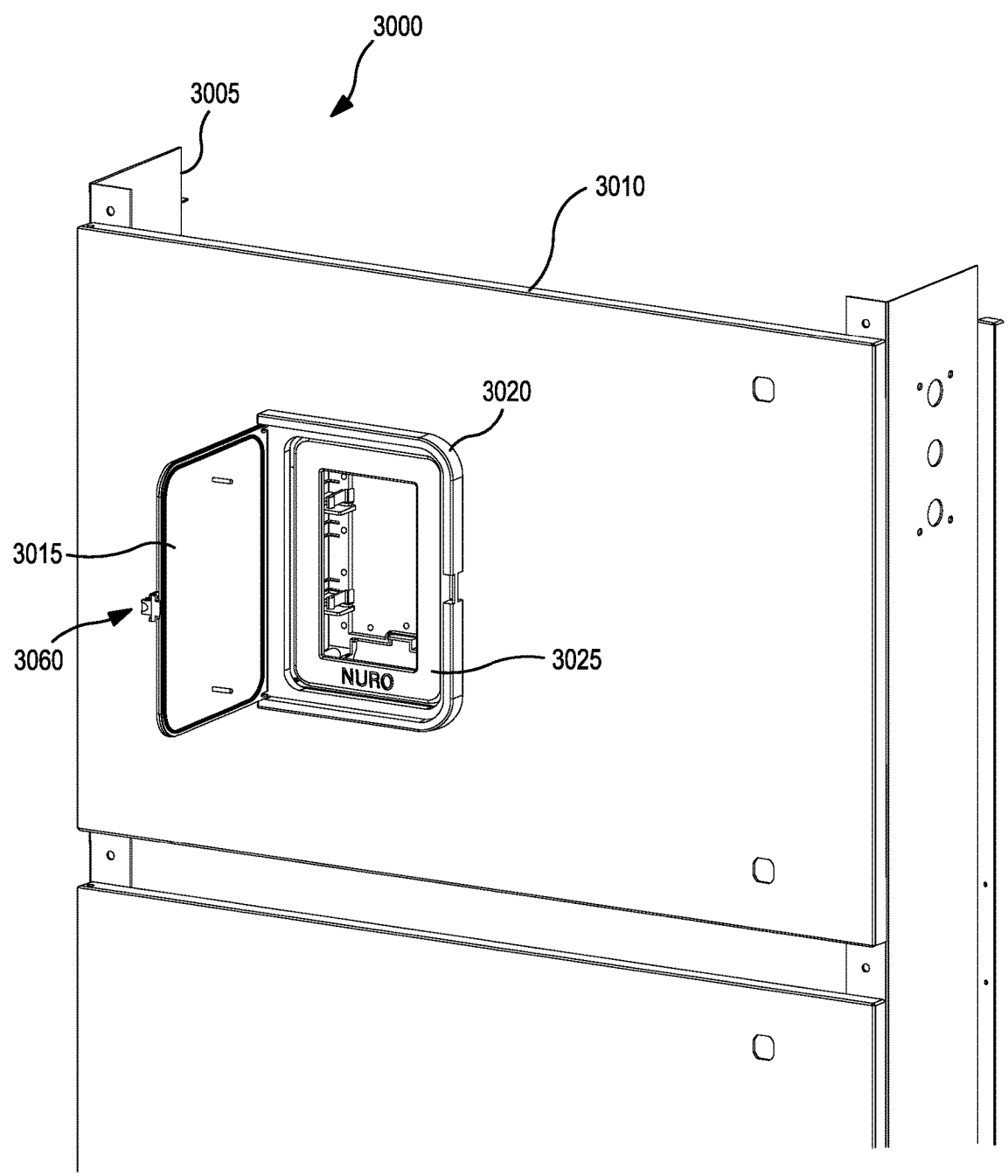

FIG. 3B is an isometric view depicting an exemplary embodiment of a mechanical system cabinet with a user interface protective access cover and associated surround that provides access to a user interface, for the mechanical system, and supported by an articulated hinge apparatus, such as shown in FIG. 3A, whereby the protective access cover is open for access with the mechanical system cabinet door closed.

Figure 3C:
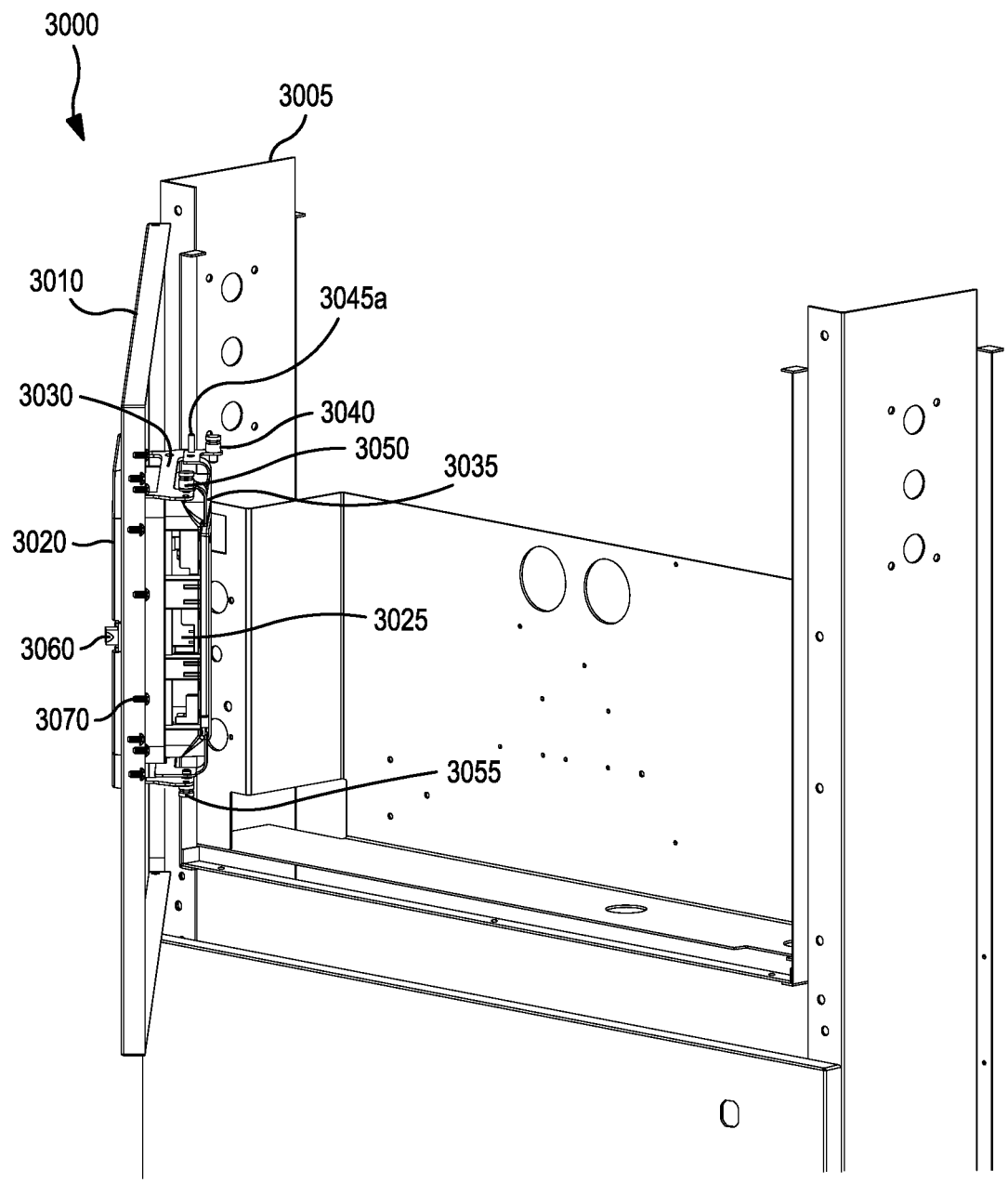

FIG. 3C is an isometric view depicting an exemplary embodiment of a mechanical system cabinet, such as shown in FIG. 3A-3B, comprising an articulated hinge apparatus to support a user interface housed in a user interface housing, whereby a door of the mechanical system cabinet is partially opened to illustrate in a downward side view the articulated hinge apparatus in a left swing and substantially closed position.

Figure 3D:
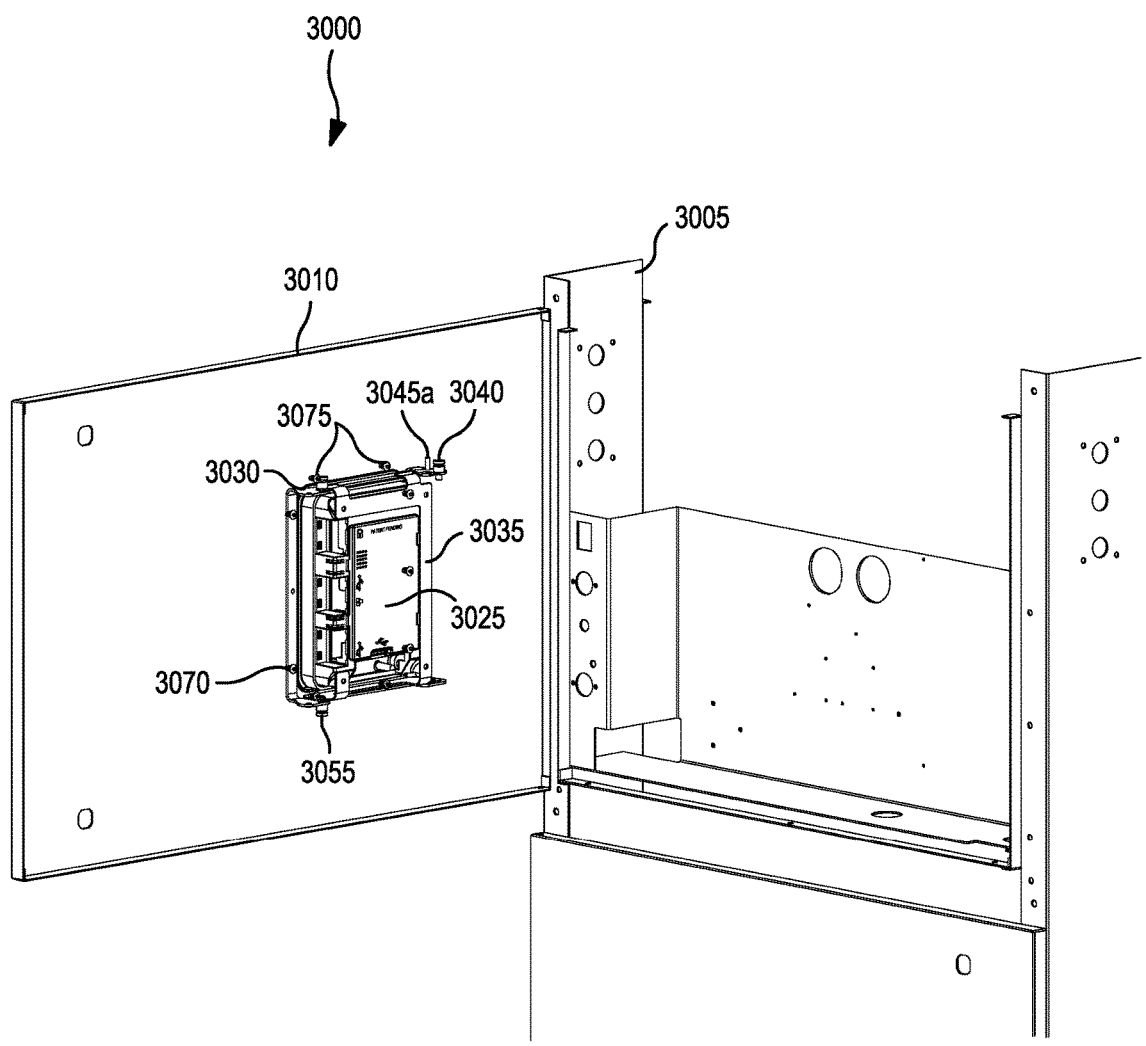

FIG. 3D is an isometric view depicting an exemplary embodiment of a mechanical system cabinet, such as shown in FIG. 3A-3C, having mounted thereto, an articulated hinge apparatus to support a user interface housed in a user interface housing, whereby a door of the mechanical system cabinet is partially opened to illustrate, in a semi-rear view, the articulated hinge apparatus in a left swing and substantially closed position.

Figure 3E:
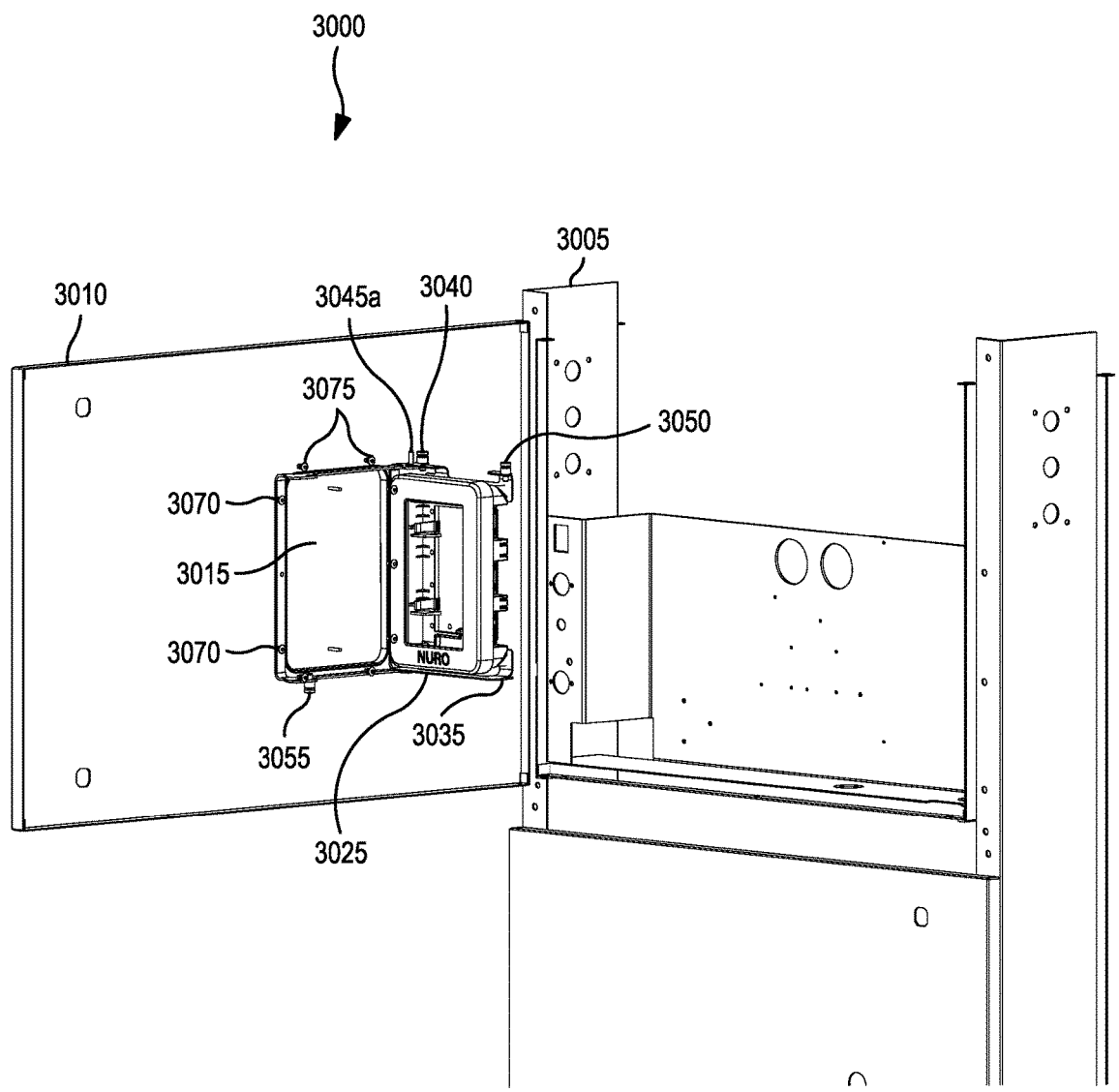

FIG. 3E is an isometric view depicting an exemplary embodiment of a mechanical system cabinet door, such as shown in FIG. 3A-3D, having mounted thereto, an articulated hinge apparatus to support a user interface housed in a user interface housing, whereby a door of the mechanical system cabinet is partially opened to illustrate, in a semi-rear view, the articulated hinge apparatus in a left swing orientation and the interface portion rotated about the hinge pins.

Figure 3F:
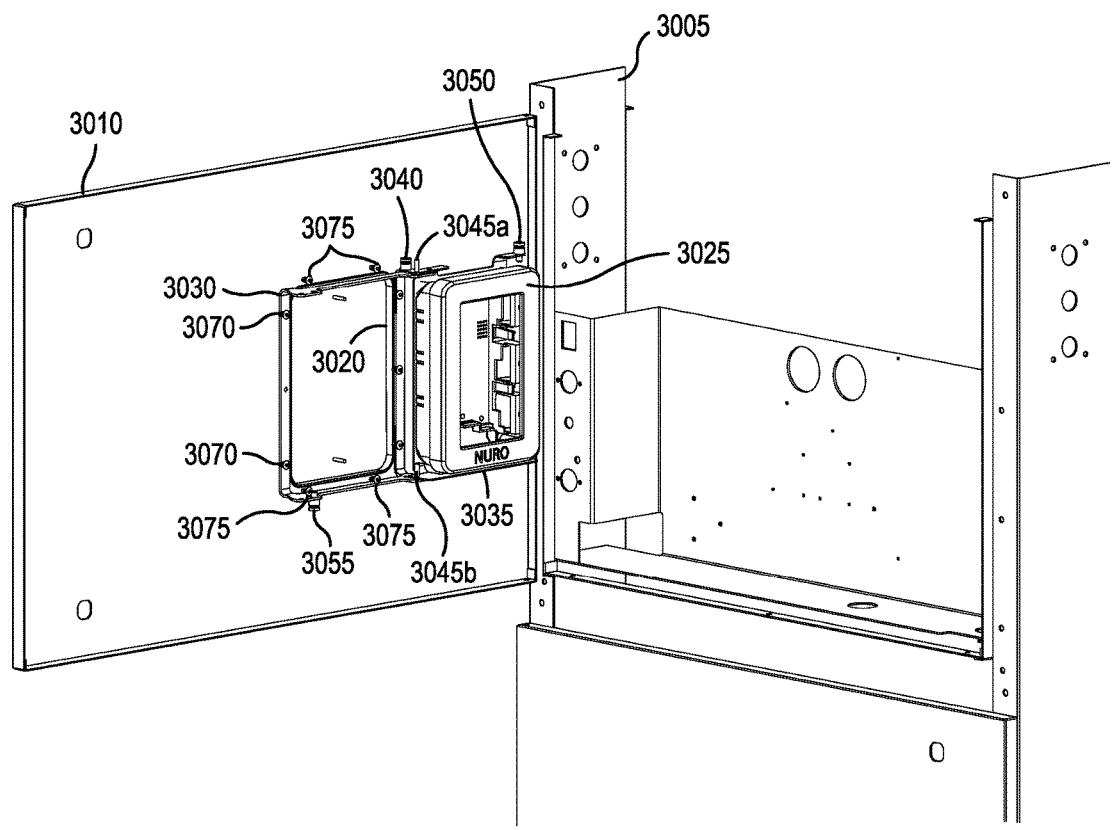

FIG. 3F is an isometric view depicting an exemplary embodiment of a mechanical system cabinet door, such as shown in FIG. 3A-3E, having mounted thereto, an articulated hinge apparatus to support a user interface housed in a user interface housing, whereby a door of the mechanical system cabinet is partially opened to illustrate, in a semi-rear view, the articulated hinge apparatus in a left swing orientation and the interface portion rotated about the hinge pins in a substantially one hundred and eighty degree position.

Figure 3G:
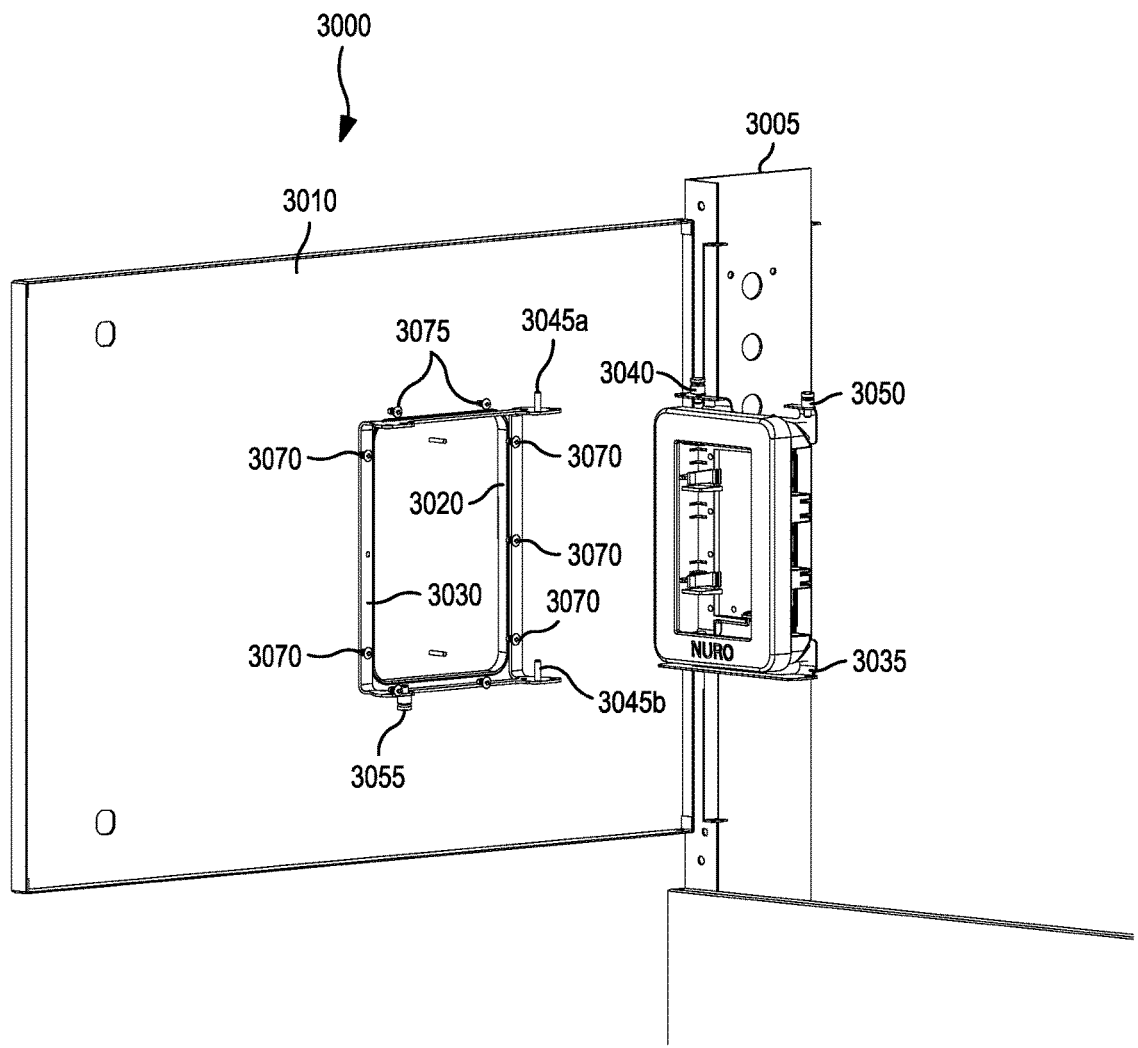

FIG. 3G is an isometric view depicting an exemplary embodiment of a mechanical system cabinet door, such as shown in FIG. 3A-3F, having mounted thereto, an articulated hinge apparatus to support a user interface housed in a user interface housing, whereby a door of the mechanical system cabinet is partially opened to illustrate, in a semi-rear view, the articulated hinge apparatus mounted in a left swing orientation and separated about its hinge pins into a mounting frame portion and interface portion.

Figure 3H:
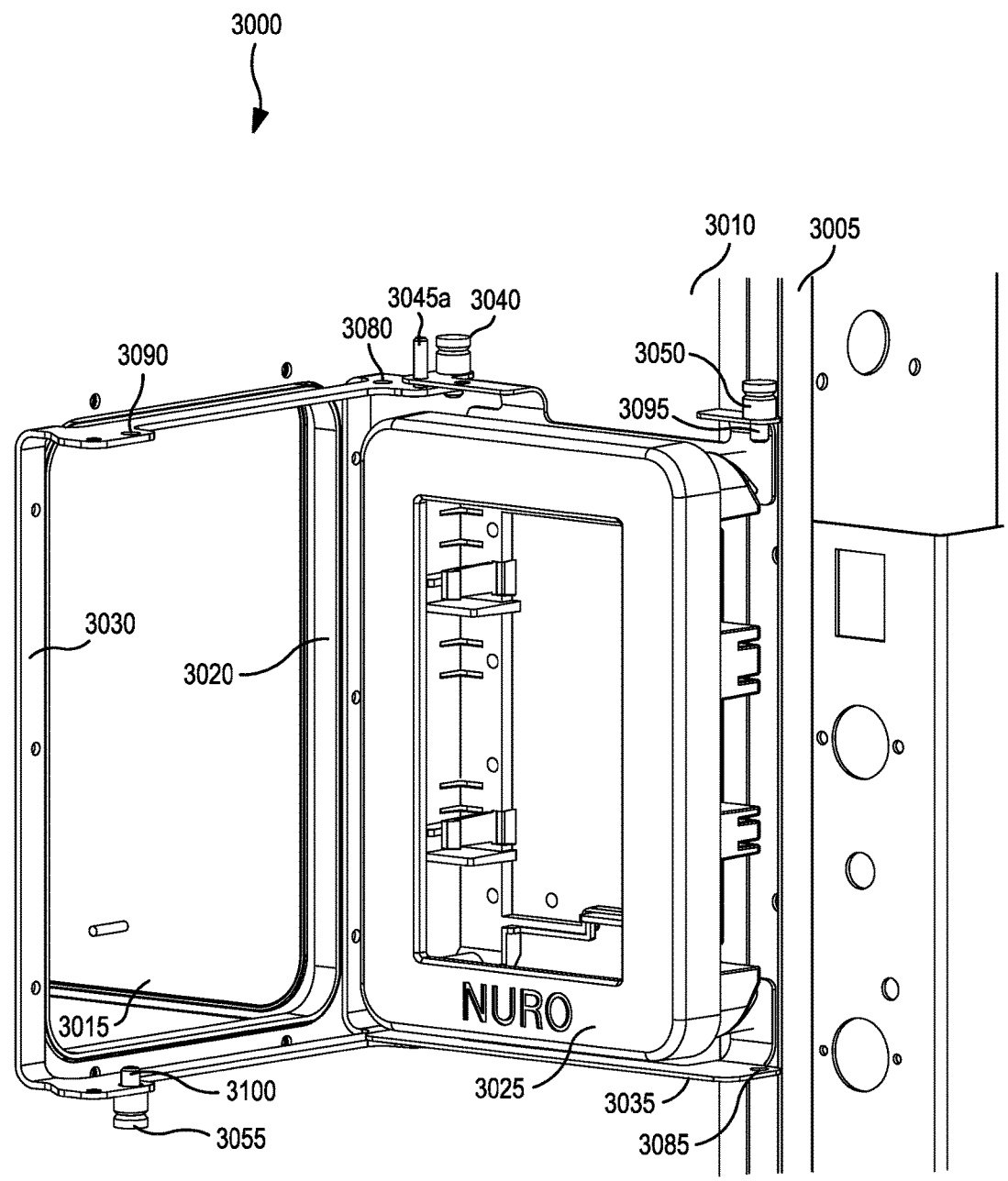

FIG. 3H is an isometric close up view depicting an exemplary embodiment of a mechanical system cabinet door, such as shown in FIG. 3E, having mounted thereto, an articulated hinge apparatus to support a user interface housed in a user interface housing, whereby a door of the mechanical system cabinet is partially opened to illustrate, in a semi-rear view, the articulated hinge apparatus in a left swing orientation and the interface frame portion rotated about the hinge pins.

Figure 4A:
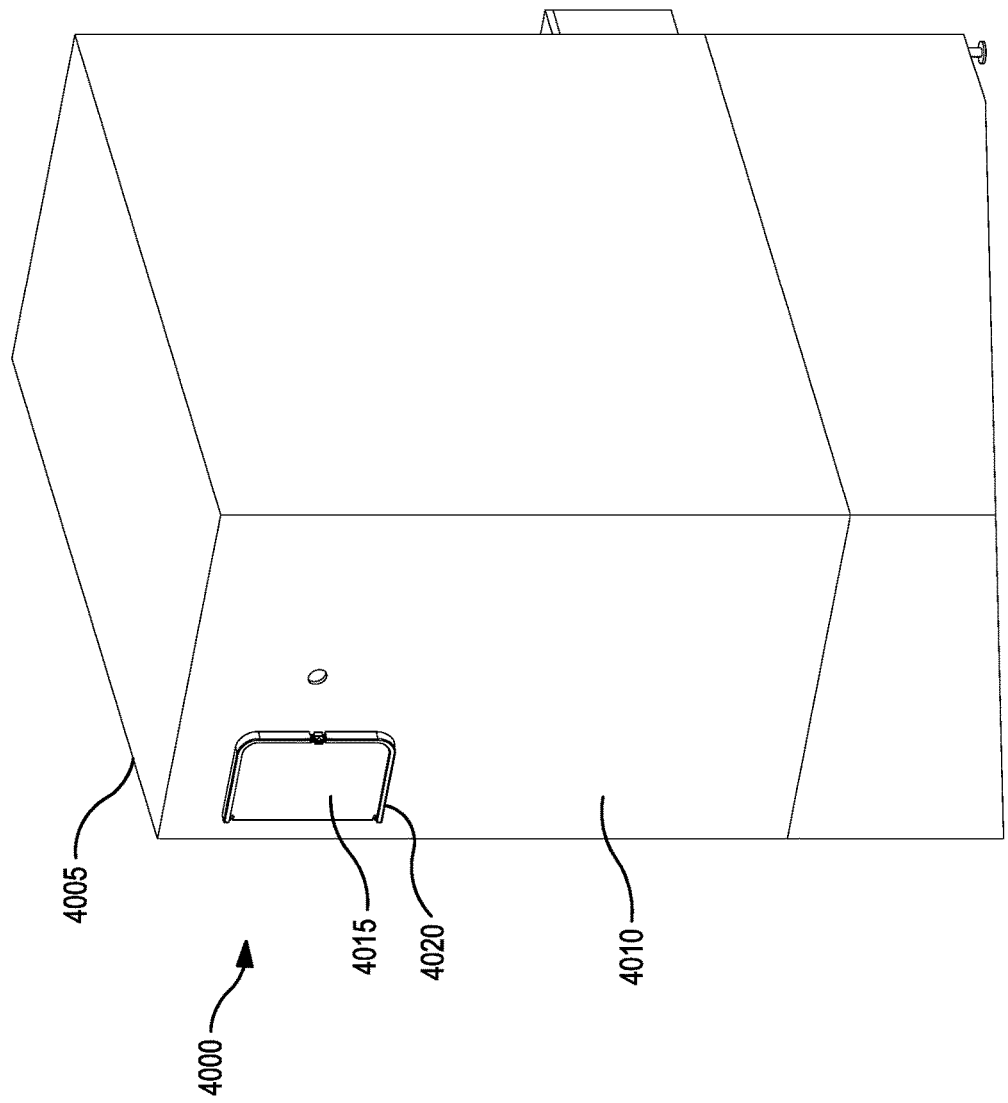

FIG. 4A is an isometric overall depiction of an exemplary embodiment of a boiler system cabinet having mounted thereto, an articulated hinge apparatus to support a user interface housed in a user interface housing and protective cover, wherein the user interface is accessible through and behind the enclosure door by articulation of the hinge apparatus.

FIG. 4B is an isometric front view close-up depiction of an exemplary embodiment of a boiler system cabinet having mounted thereto, an articulated hinge apparatus to support a user interface housed in a user interface housing and protective cover, wherein the protective cover is open and the user interface is accessible through and behind the enclosure door by articulation of the hinge apparatus.

Figure 4C:
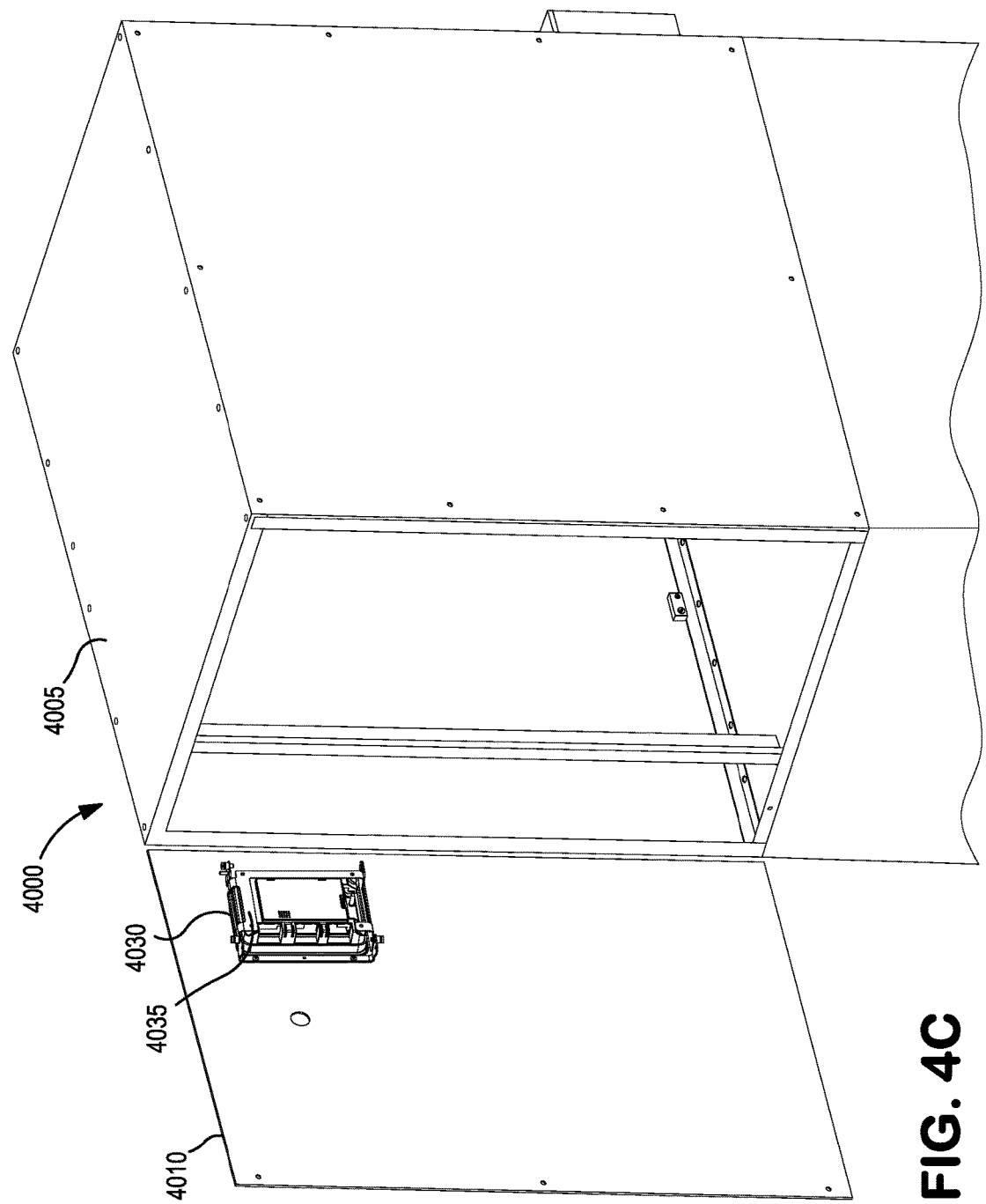

FIG. 4C is an isometric front view close-up depiction of an exemplary embodiment of a boiler system cabinet having mounted thereto, an articulated hinge apparatus to support a user interface housed in a user interface housing, whereby a door of the boiler system cabinet is partially opened to illustrate, in a semi-rear view, the articulated hinge apparatus in a left swing orientation and substantially closed position.

Figure 4D:
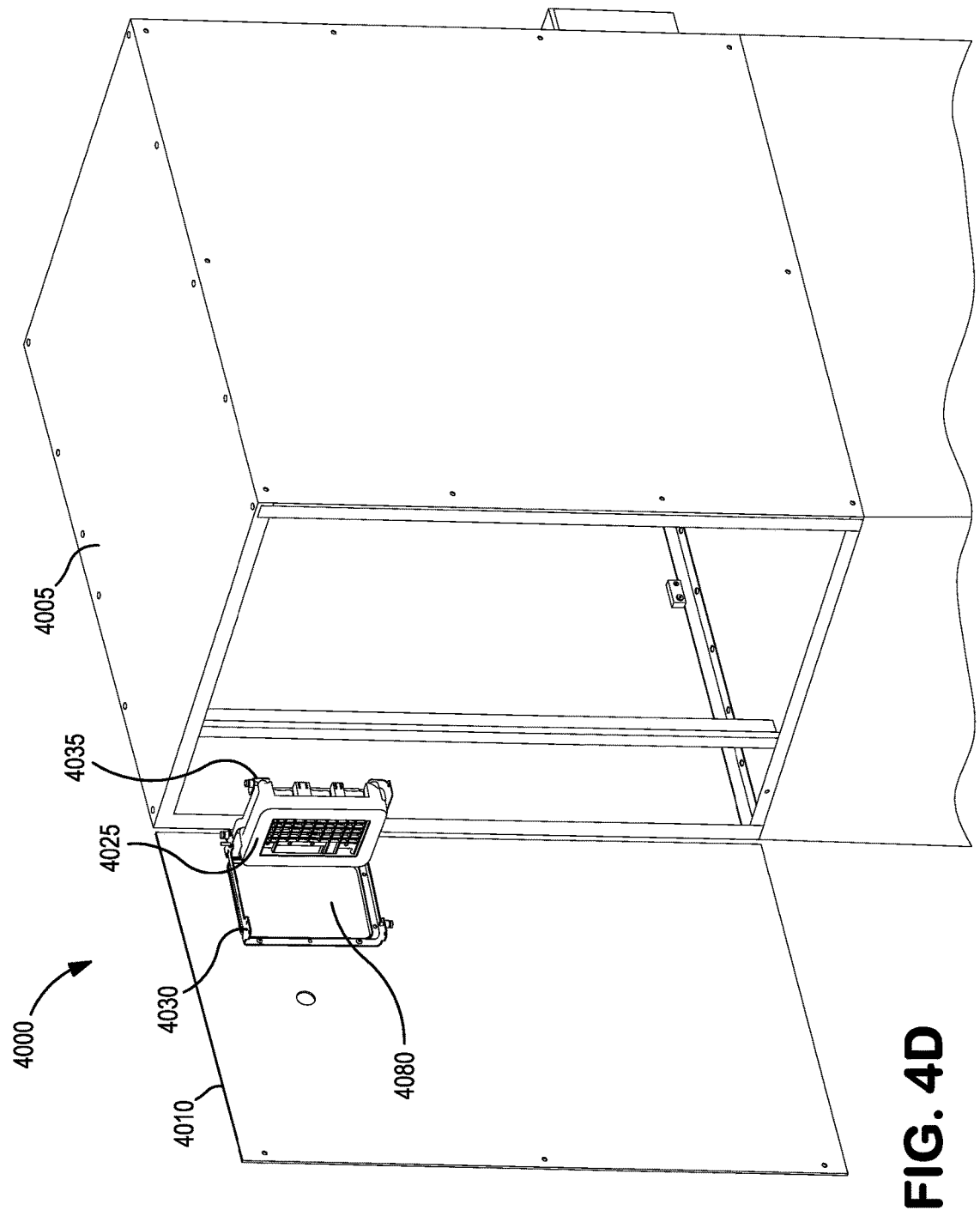

FIG. 4D is an isometric front view close-up depiction of an exemplary embodiment of a boiler system cabinet having mounted thereto, an articulated hinge apparatus to support a user interface housed in a user interface housing, whereby a door of the boiler system cabinet is partially opened to illustrate, in a semi-rear view, the articulated hinge apparatus in a left swing orientation and the interface frame portion rotated about the hinge pins.

Figure 4E:
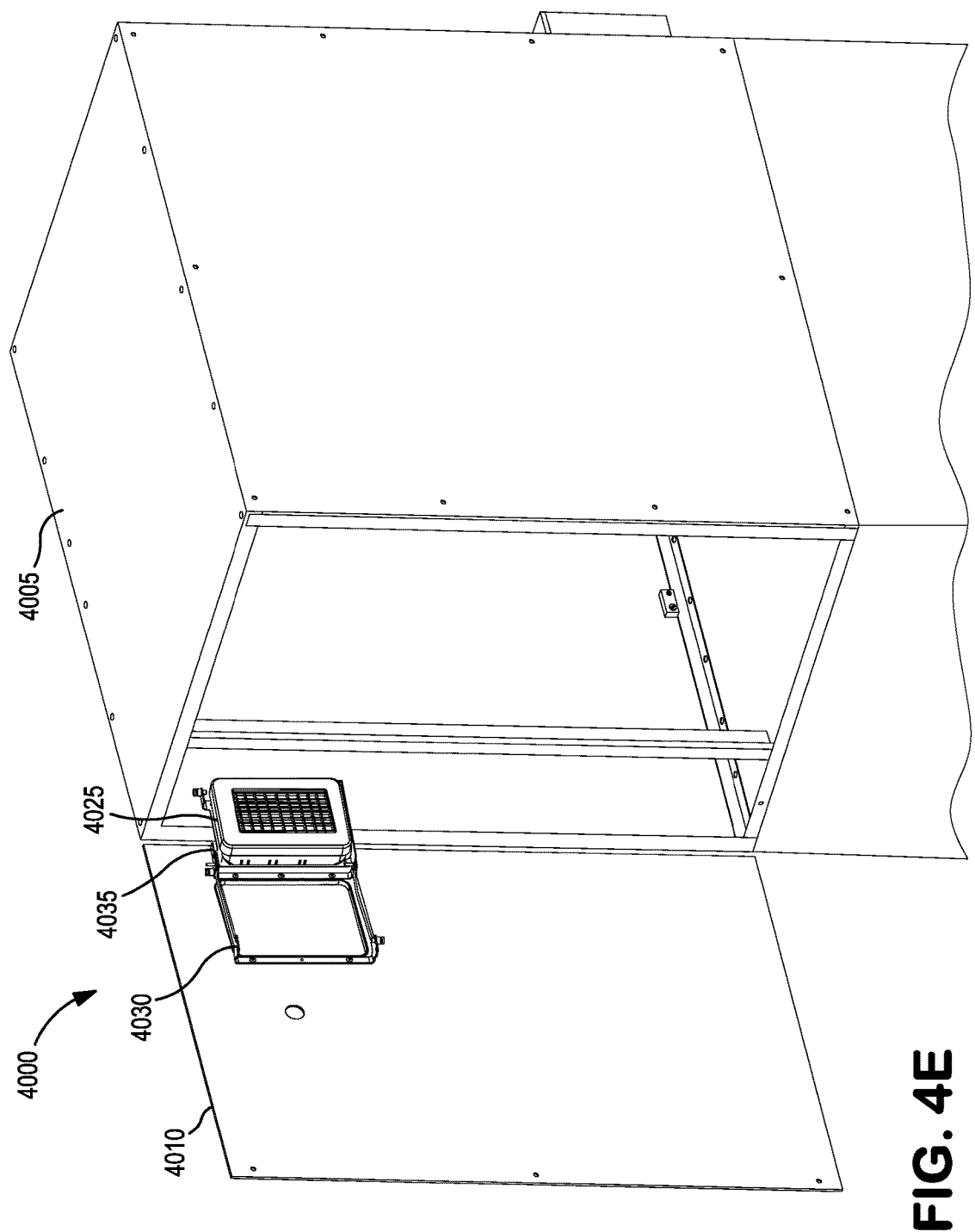

FIG. 4E is an isometric front view close-up depiction of an exemplary embodiment of a boiler system cabinet having mounted thereto, an articulated hinge apparatus to support a user interface housed in a user interface housing, whereby a door of the boiler system cabinet is partially opened to illustrate, in a semi-rear view, the articulated hinge apparatus in a left swing orientation and the interface portion rotated about the hinge pins in a substantially one hundred and eighty degree position.

DETAILED DESCRIPTION OF THE INVENTION

A hinge apparatus as a support structure is provided wherein a user interface of an electro-mechanical system can be incorporated into a cabinet housing an electro-mechanical system (such as a boiler system or hot water heater system), to provide full access to, and interaction with, the user interface during local manipulation with the system without encumbering service access to internal components of the electro-mechanical system. To provide full and unencumbered concurrent access to the internal components and the user interface, a hinge apparatus supporting the user interface can be articulated to provide various positions. Generally during operational periods, the hinge apparatus supporting the user interface remains in a closed position, such that interaction with the user interface is achieved through an opening in the cabinet. Non-operational periods may require the hinge apparatus supporting the user interface take positions other than closed, such as partially open, such that a technician can mutually and concurrently interact with both the internal workings of the system cabinet and the user interface to monitor and/or adjust parameters.

Construction and layout of a hinge apparatus follows. An exemplary embodiment involves mounting the hinge apparatus to the interior surface of the electro-mechanical system's cabinet door, wherein a hole is provided in the cabinet door to provide access to a user interface when the door is closed and the hinge apparatus is in its closed and locked position, such as when the a boiler system is in use or operation. When the cabinet door is opened, such as for service, the articulated hinge apparatus, can be unlocked and swung about it's pivot(s) to provide access and interaction with the user interface. Such mounting is absent any interference with the electro-mechanical components interior to the cabinet when the cabinet door is open, thereby granting unobstructed access to the components housed therein. The entirety of the cabinet cavity can be access without intrusion of the user interface or its mounting assembly.

A user interface may be installed within a user interface housing to protect the user interface from environmental conditions; the user interface housing is therein fastened to the hinge apparatus. By way of exemplary embodiment, a hinged apparatus may further be fabricated as described below.

A hinge apparatus comprises an interface frame (a first portion) to which a user interface may be attached. The interface frame has an interface mount side and an opposing side. A base frame, to which the interface frame is attached via one or more hinge pins, comprises a second portion of the hinge apparatus. Comprising a cabinet mount side and a cabinet opposing side, the base frame may have a substantially rectangular shape and may be fabricated from one piece or fabricated from multiple pieces joined together by either fasteners, welding or other known joining methods. Base frames may comprise an upper member, a lower member, and one or more vertical members. Upper members of a base frame may have an upper face and an opposing face and may also be part of, or attached to, each of the vertical members. In kind, the lower members of the base frame, if constructed as such, may have a lower face and an opposing face and may be part of, or attached to, each of the vertical members. A base frame upper member may be bent back, away from the cabinet mount side or attached to each vertical member at a right angle. One or more vertical members may be comprised within the base frame and have a cabinet mounting face and an opposing face. The cabinet mounting face may specifically be a cabinet door mounting face, if the hinge apparatus is mounted to a cabinet door as previously described. Orientation of a base frame upper member may be such that the upper face is at an angle (such as ninety degrees) to the cabinet mounting face, if so applied. The orientation may also apply to installation on the cabinet door. Base frames may comprise one or more holes fabricated in the upper portion of the base frame proximate to a hinge pin and circumferential about the hinge pin, such that with use of a corresponding locating pin in the interface frame, an operator can position the interface frame relative to the base frame and thus relative to the cabinet mounting configuration, such as if the hinge apparatus is mounted on the door.

Although fabrication in metal may have the best strength to weight ratio, other materials, such as plastics or composites may be used to fabricate the various components, such as the base frame and interface frame. Metals such as aluminum or steel may be used. Or, plastics that can be injection formed, such as polycarbonate can be used. A user interface, or user interface enclosure, may be removeably snapped into position on the interface frame. Spring tabs may take the place of metal or plastic screws to retain the user interface/user interface enclosure to the interface frame.

Interface frames may follow the same fabrication variations as those described above for the base frame. Interface frames may be fabricated from one or more pieces of material. Upper and lower members may comprise one or more locating holes and may also each comprise a hinged portion. Such hinged portions may have fabricated therein and proximate to the hinge pins one or more locating holes therein for accepting one of the one or more locating pins (further described below). A locating pin may be a solid pin, or a locating pin assembly, having a retention spring for automatic insertion into a locating hole when suitably aligned.

A hinge apparatus may be fabricated and installed in various configurations. For instance, the hinge apparatus may be mounted such that the hinge action is left-swing oriented or right-swing oriented; dependent on whether the hinge(s), are oriented to the left or right of center. Alternatively the hinge action may be made to swing up or down if the hinge apparatus is rotated ninety degrees to that of a vertical axis pivot arrangement. In practice any desired angle may be achieved depending on the degree of rotation the hinge apparatus is mounted.

An upper member of a base frame, distal to the hinged end, may comprise a locking portion proximate to one of the one or more vertical members and have one or more holes located therein. Alternatively, upper member locking portion may extend perpendicular to the upper member and one of the one or more vertical members and coincide with the location of at least one of the one or more locking pins. One or more locating pins (or pin assemblies) may be mounted to the interface frame to retain the interface frame in a user selectable position relative to the base frame and about hinge axis. Corresponding locating holes may also be fabricated into the base frame, to which the locating pins fit. Default positions may be provided, such as a closed position, a ninety degree position, and a fully laid back position (substantially one hundred and eighty degrees from closed). Alternatively one or more release pins may be mounted to the base frame and the fabricated holes may be located into the interface frame. Additionally, the hinge apparatus may use a combination of both. Release pins may also retain the interface frame to one or more relative positions of the base frame. For example, the hinge apparatus may have an upper and lower release pin and coinciding release pin hole. Release pins (or release pin assemblies) may reside on one frame, such as the interface frame, or located on each with the coinciding hole residing on the other frame. One or more release pins and coinciding release pin receiving holes may retain the interface frame to the base frame in a zero degree (closed) position. To rotate the interface frame, an operator would separate each of the release pins from the corresponding release pin receiving holes.

Release pins, tensioned by springs may counteract gravity or vibration and better retain the base frame to interface frame relative positions, especially during operation of the electro-mechanical system. Beyond the closed, ninety, and one hundred and eighty degree positions, other various positions can be used dependent on requiring factors, such as placement, or orientation of the hinge apparatus, cabinet door configuration or other factors.

Removal of the interface frame from the base frame may facilitate use of the user interface during some operations or cleaning. Removal may facilitate installation of the user interface or update of the user interface. The user interface may be provided with a substantially long electrical lead to allow the user interface to be hung above or around the cabinet, such that a service technician or installer can view the user interface from positions other than directly in front of the cabinet enclosure opening associated with the cabinet door. Removal or reinstallation of the interface frame to the base frame may require manipulation of one or more restraining fasteners associated with the hinge pin(s).

Although several hinge types can be employed, one or more hinge pins may be mounted on either the interface frame or the base frame to provide a simple pivot method. Hinge pins mounted on the interface frame would stay with the interface frame should the frame be removed from the base frame, and vise versa. If two hinge pins are fabricated into the base frame corresponding holes must be fabricated into the other frame. Fabricating the base frame with the hinge pins may improve user reinstallation of a interface frame to a base frame since locating a hole over a pin is often simpler than the reverse. To aide in the reinstallation, one hinge pin may be slightly longer than the other. Hinge pins may be removable or the hinge pins may be retractable or part of a retractable mechanism, such as by a users finger and return via spring.

As previously described, the base frame and interface frame may be oriented to have the axis of the hinge pivot horizontal, or alternatively perpendicular to that of a cabinet, or cabinet door to which the hinge apparatus may be mounted. Rotation of the user interface may be facilitated by a second hinge axis of the base frame and interface frame to reposition the interface from say vertical to horizontal or vise versa. The base frame and interface frame may also have a dual hinge mechanism wherein the interface frame may be pivoted relative to the base frame, based on which hinge pin set the user decides to use. For example, a user may elect to have the interface frame pivot to the left by selecting to leave the left hinge pins in place and retract the right hinge pin set, thereby hingedly rotating the interface frame in a clockwise direction, when viewed from the top. In a counter example, the user may elect to pivot the interface frame (relative to the base frame) in the opposite direction, wherein the left hinge pin set is retracted and the interface frame pivots via the right hinge pin set. In an alternative embodiment, an intermediate frame may be attached between the base frame and the interface frame. An intermediate frame may be attached to the base frame via a hinge pin set. An intermediate frame hinge pin set may be located on one side of the intermediate frame and correspond with a hinge pin receiving hole set on the base frame. Alternatively an intermediate frame may be attached to the interface frame via a second hinge pin set. Intermediate frame hinge pin set and second hinge pin set may be attached to the intermediate frame or mounted in an alternative configuration. For example, the hinge pin set may be mounted on the base plate and the corresponding holes fabricated into the intermediate frame. The second hinge pin set may also be alternatively mounted. The second hinge pin set may be mounted on the interface frame and the corresponding hinge pin holes fabricated into the intermediate frame.

In one embodiment, the hinge apparatus, for example, may be used on a boiler system. The boiler system may be one of multiple boilers, each having a local control interface. During standard operation procedures each of the local control interfaces may be examined. Furthermore, each of the boiler cabinets may be opened and periodically adjusted, the technician wanting to monitor any changes via the user interface. Fabricated with the hinge apparatus mounted to the door, the technician can rotate the hinge apparatus, and therefore the user interface, to affect the change while monitoring the interface.

Figure 1:
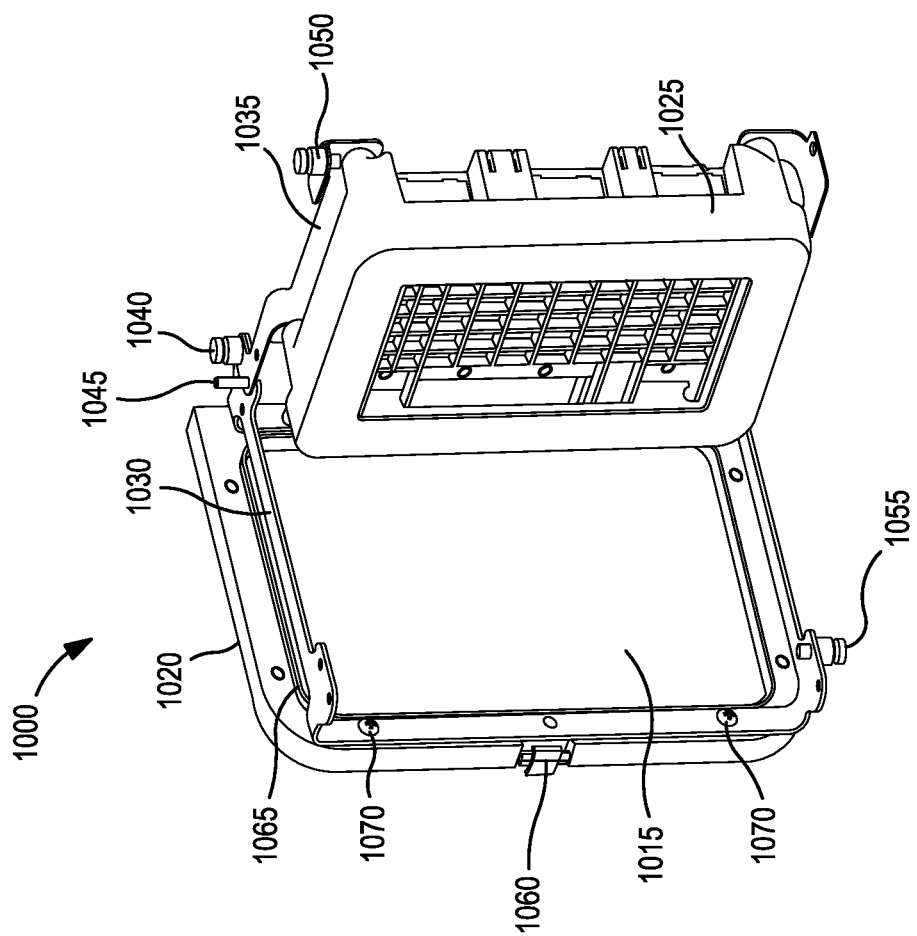
FIG. 1 is an isometric view depicting an exemplary embodiment of an articulated hinge apparatus and a protective surround and cover in concert with a user interface enclosure.

Turning to FIG. 1, an illustration 1000 of one embodiment of the hinge apparatus and is depicted in a partially rotated position and absent a cabinet panel to which it may be mounted. In this illustration, the hinge apparatus comprises a base frame 1030 fabricated to comprise hinge pins, (upper hinge pin 1045 and lower hinge pin (not shown)) at the side distal to the viewer and on the upper and lower members of the base frame 1030. Hingedly attached to the base frame 1030 via the hinge pins, is an interface frame 1035 having corresponding hinge pin receiving holes (obscured) at the upper and lower portions of the interface frame 1035. A locator pin 1040 depicted proximate to the upper hinge 1045, locates the interface frame to a predetermined rotational position by use of corresponding locator pin receiving holes in the base frame 1030. Distal to the hinge axis and mounted on the upper portion of the interface frame 1035, is an upper release pin assembly 1050 fabricated on a tang. A similar but lower release pin assembly 1055 is mounted on the lower member of the base frame distal to the hinge axis and formed into a tang of the frame. The release pin assemblies 1050, 1055 retain the interface frame 1035 in the closed position by use of corresponding release pin tip receiving holes in the upper portion of the base frame 1030 and lower portion of the interface frame 1035. While the base frame is an open structure design to provide clear access to the user interface, the interface frame may or may not make use of an open design. An open design for the interface frame may provide an ease of installation and access to the back of the user interface (not shown).

A protective cover assembly 1020, is fastened to the cabinet door (not shown). The protective cover assembly 1020 is also fastened through the cabinet (not shown), or cabinet door (not shown) to the base frame 1030 by fasteners 1070. The fasteners 1070 may alternatively fasten the base frame 1030 to the cabinet itself (not shown), wherein a relief may be provided in the protective cover assembly for the fasteners 1070 to protrude into. Attached to the protective cover assembly 1020 is a protective cover door 1015, whereby when opened an operator can access a user interface (not shown) installed into the user interface enclosure 1025, to effectuate an action or view a reading. A seal 1065 is provided with the protective cover to seal the user interface from the elements and a handle 1060 is provided on the protective cover 1015, such that the protective cover may be opened and latched or snapped closed In an alternative embodiment FIG. 2A depicts an illustration 2000 of a human form 2200 standing in front of a cabinet 2005, wherein the cabinet door 2010 is partially open and the interface frame 2035 of the hinge apparatus, along with the user interface enclosure 2025 are separated from the base frame 2030. In such an embodiment, and as previously described the user interface may (with the attached interface frame) be moved about to facilitate service or installation of the user interface, or electro-mechanical system as a whole. The alternative embodiment shown in FIG. 28 depicts the cabinet door 2010 of the cabinet 2005 further open with the interface frame 2035 of the hinge apparatus, along with the user interface enclosure 2025, hingedly attached to the base frame 2030. The representative human 2200 has clear access to the cabinet interior without obstruction by the user interface or mounting assembly of the hinge apparatus. Not shown but in an alternative, the cabinet door 2010 may be partially closed such that the user will have more direct view of the user interface. In a further alternative configuration not shown, the hinge apparatus may be mounted in a right-swing orientation, whereby when the cabinet door 2010 is opened in the fashion shown, the representative human operator 2200 may have the user interface swung in a right swinging fashion directing the user interface in his direction at a ninety degree orientation to the cabinet opening. Other orientations and hinge arrangements have been previously described and may further lend improved viewing and interaction with the user interface while simultaneous not obstructing access to the cabinet interior.

Alternative exemplary embodiments as depicted in FIGS. 3A-3G, illustrate various views of the installation and configuration 3000 of a hinge apparatus to support a user interface for use during operation and service of the associated electro-mechanical system, while not impeding access to the internal components of the system. FIGS. 3A-3G for example depict a front view an electro-mechanical system cabinet 3005 with a door 3010. A hinged protective cover 3015 is provided with the protective cover assembly 3020, such that handle 3060 can be used to open the hinged protective cover 3015 and access the user interface within (and via a hole in the cabinet door 3010), while the cabinet door 3010 is in the closed position as shown in FIG. 3A-3B. This closed position of the cabinet door 3010, and access to the user interface, in the manner described immediately above occurs during normal operation. The protective cover assembly 3020 is fastened to the exterior surface of the cabinet door 3010 by an additional multitude of screws 3075; the fasteners 3075 applied from the interior surface outward.

Under servicing conditions, or during initial set up of the system, the electro-mechanical system cabinet 3005 may require access to the internal components, while still monitoring or managing the system via the user interface. To facilitate this, the hinge apparatus shown in FIG. 3C-3G is mounted to the interior side of the cabinet door 3010. As described above, a hole is provided for access to the user interface when the cabinet door 3010 is close. However, when the cabinet door 3010 is open, the hinge apparatus can pivot about a hinge axis provided by two hinge pins (3045a, 3045b) mounted in the base frame 3030, an upper hinge pin 3045a and lower hinge pin 3045b (lower hinge pin 3045b obscured in FIGS. 3C-3E, 3H). The base frame 3030 is fabricated with an upper and lower portion bent ninety degrees to vertical members. Upon the upper and lower portions of the base frame 3030, the two hinge pins (3045a, 3045b) are mounted. Securing the hinge apparatus to the cabinet door 3010, base frame 3030 is mounted to the interior surface of the cabinet door 3010 by a multitude of fasteners 3070 passing through the vertical members of the base frame 3030.

Allowing the user interface to rotate about, such that an operator can access and interact with the user interface during operation, servicing, testing or installation of the cabinet internals, the base frame 3030 has hingedly mounted thereto an interface frame 3035, which supports a user interface enclosure 3025. The hinge apparatus shown depicts the hinge operating in a left-swing orientation, such that when the hinge is operated, the interface frame 3035 and user interface enclosure 3025 housing a user interface would swing from left to right.

For an operator to rotate the interface frame 3035 about the hinge pin axis, the operator must release the interface frame 3035 from the base frame 3035 by withdrawing one or more release pin tips (3095, 3100) from corresponding holes. Fabricated into a bent form (roughly a C-shape), the interface frame 3035 comprises two upper portions: an upper hinge portion and a release portion, both configured to extend upward and over the top portion of the user interface enclosure 3025 from a horizontal rear member. The horizontal rear member is a contiguous portion of the back, extending from a vertical member. The lower portion of the interface frame 3035 is a singular portion configured to extend downward and under the bottom of the user interface enclosure 3025. The single vertical member connects the upper portion to the lower portion proximate to the hinge axis. A short vertical tab member, extending around the bottom of the user interface enclosure along the back and distal to the hinge axis provides a mounting point for the coinciding bottom corner of the user interface enclosure to be fastened to the interface frame 3035. The upper mounting of the user interface enclosure 3025 is achieved by fasteners (not shown) passing through the horizontal member of the interface frame and into corresponding holes in the user interface enclosure 3025.

The singular lower portion of the interface frame 3035, comprises both a lower hinge pin tip receiving hole (view obstructed) coinciding with and acceptable to the lower hinge pin 3045b, as well as a lower release pin receiving hole 3085 coinciding with the release pin tip 3100 on the base frame 3030. The user interface enclosure 3025 is fastened by several fasteners (not shown) passing through holes in the interface frame 3035 and into corresponding locations in the back of the user interface enclosure 3025.

As mentioned above, hinge pins (3045a, 3045b) are affixed to the base frame 3030 at one side of each upper portion and lower portion. Proximate to the upper hinge pin 3045a are a series of locating holes 3080 fabricated into the upper portion of the base frame around the hinge pin, into which a locating pin 3040 can be set; fixing the rotational position of the interface frame 3035, and therefore the user interface enclosure 3025 and user interface. The locating pin 3040 is mounted to the interface frame 3035 such that an operator can lift the pin to unsecure it from one of the corresponding locating hole 3080 in the base frame 3030, so as to rotatably move the interface frame 3035 about. When a suitable position is found the operator can let the locating pin 3040 go. As mentioned previously, the pin can be spring mounted, such that the pin will automatically drop into one of the corresponding locating holes 3080, once alignment is achieved. An additional hole, an upper release pin receiving hole 3090 is fabricated into the upper portion of the base frame distal to the hinge pin 3045a. This hole accepts a corresponding upper release pin tip 3095 of upper release pin assembly 3050. In FIG. 3F, the interface frame 3035 and user interface enclosure 3025 are depicted in the substantially fully open position allowing an operator to interact with the user interface and the internal components of the system without interference from the user interface and without the interface frame and user interface being removed from the hinge. Other hinge orientation and enclosure door opening position combinations can provide an operator with mutual interaction without interference.

A similar but reversed release pin arrangement is provided in the lower portion of the hinge apparatus. Affixed into the lower portion of the base frame 3030, distal to the hinge axis, is a lower release pin assembly 3055, comprising a release pin tip 3100. As depicted in FIG. 3G, the interface frame 3035 can be lifted off the upwardly protruding hinge pins 3045a and 3045b. In this hinge pin arrangement the interface frame 3035 (when closed) mates with the base frame in a manner where the upper and lower portions of the interface frame 3035 extends over the upper and lower portions of the base frame 3030, which is evident in FIGS. 3C-3H.

Turning to FIGS. 4A-4E, an exemplary embodiment of a boiler system 4000 is depicted using the hinge apparatus. The boiler system 4000, exhibits a cabinet 4005, comprising a cabinet door 4010 a protective cover assembly 4020 and a protective cover 4015, under which is a user interface housing 4025. In FIG. 4A and FIG. 48 the front of the boiler system 4000 is shown depicting the cabinet door 4010 as closed with the protective cover closed and opened respectively. FIGS. 4C-4E depict the cabinet door 4010 partially open, showing among other things the hinge apparatus comprising a base frame 4030, and an interface frame 4035, with the interface frame in various positions. The depictions show the user interface placed in the upper left corner of the cabinet. However, other positions can be used. In addition the figures depict the hinge apparatus have a left-swing hinge orientation. Other orientations can be used as well. For example, a base frame could be fabricated and mounted such that the hinge axis resides on the right side of the base frame with associated hinge pins pointing upward. This right-swing hinge orientation might allow the operator or service technician to swing the cabinet door 4010 open substantially two hundred and seventy degrees and after releasing and rotatably positioning the interface frame, still be able to access and interact with the user interface while manipulating components within the system and without the interface or mounting creating an obstruction to any of the internal components of the cabinet.

Various aspects of the differing embodiments of the hinge apparatus may be combined without limitation. While some of the figures and related descriptions might not describe each and every component, the absence does not exclude those components from such embodiments.

Statement Regarding Preferred Embodiments

While the invention has been described with respect to the foregoing, those skilled in the art will readily appreciate that various changes and/or modifications can be made to the invention without departing from the spirit or scope of the invention as defined by the appended claims.

What is claimed is:

1. A hinge apparatus for mounting a user interface to a door of an electro-mechanical system cabinet, the hinge apparatus comprising:
   a base frame, defining a substantially rectangular opening, for fastening said hinge apparatus to said door of said electro-mechanical system cabinet, said base frame comprising
      a first vertical member,
      a second vertical member distal from said first vertical member,
      a first horizontal member joined between said first vertical member and said second vertical member, comprising, a first base tang, and a second base tang,
      a second horizontal member, distal from said first horizontal member and joined between said first vertical member and said second vertical member, comprising a third base tang; and
   an interface frame, defining a substantially 'C' shape, hingedly mounted to said base frame, for affixing said user interface, said interface frame comprising
      a vertical interface member,
      a first horizontal interface member joined to said vertical interface member and comprising
         a first interface tang, and
      a second horizontal interface member distal from said first horizontal interface member comprising
         a third interface tang, and
         a fourth interface tang distal from said third interface tang,
   said interface frame via said first interface tang and said second horizontal interface member hingedly mounts to said base frame with said first base tang and said third base tang respectively,
   wherein, said interface frame allows mounting of said user interface via said first horizontal interface member, said vertical interface member and said fourth interface tang, and said hinge apparatus allows unobstructed access to said user interface and said electro-mechanical system cabinet.

2. The hinge apparatus of claim 1, wherein said interface flame is rotatably positioned in a closed position for operational use.

3. The hinge apparatus of claim 1, wherein said interface frame is rotatably positioned in an open position for operating said user interface while servicing said electro-mechanical system.

4. The hinge apparatus of claim 3, wherein said open position of said interface frame allows concurrent interaction with said user interface when said door of said electro-mechanical system cabinet is open.

5. The hinge apparatus of claim 1, wherein said base frame comprises an upper hinge pin mounted in said first base tang, and a lower hinge pin mounted in said third base tang.

6. The hinge apparatus of claim 1, wherein said interface frame is removable from said base frame.

7. The hinge apparatus of claim 1, wherein said interface frame is hingedly mounted to said base frame in an orientation chosen from the group comprising: a left-swing orientation, a right swing orientation, an up-swing orientation, and a down-swing orientation.

8. The hinge apparatus of claim 1, wherein said interface frame is hingedly mounted to said base frame in a right-swing orientation.

9. The hinge apparatus of claim 1, wherein said base frame comprises one or more locating holes within said first base tang.

10. The hinge apparatus of claim 1, wherein said first interface tang of said interface frame comprises a locating pin corresponding to one or more locating holes in said first base tang of said base frame.

11. The hinge apparatus of claim 1, wherein said interface frame comprises a locating pin mounted to said first interface tang and corresponding to one or more locating holes in said first base tang of said base frame and one of said one or more holes is associated with a fully open position of said interface frame.

12. The hinge apparatus of claim 11, wherein said fully open position coincides with a substantially 180 degree angle between said interface frame and said base frame.

13. The hinge apparatus of claim 12, wherein said substantially 180 degree angle between said interface frame and said base frame allows an operator to concurrently interact with said user interface and contents of said electro-mechanical system cabinet.

14. The hinge apparatus of claim 1, wherein said second base tang of said base frame comprises a release pin receiving hole.

15. The hinge apparatus of claim 1, wherein said first horizontal interface member further comprises a second interface tang, distal from said first interface tang, and comprises a release pin corresponding to a release pin receiving hole in said second base tang of said base frame, whereby alignment of said release pin with said release pin receiving hole coincides with a locked position of said hinge apparatus.

16. The hinge apparatus of claim 1, wherein said base frame comprises two affixed hinge pins, and said interface frame comprises two hinge pin receiving holes for hingedly mounting said interface frame; and said interface frame comprises a release pin distal to one of said two hinge pin receiving holes.

17. The hinge apparatus of claim 1, wherein said first vertical member and said second vertical member of said base frame allows for fastening said base frame to door of said electro-mechanical system cabinet.

18. The hinge apparatus of claim 1, wherein material for fabricating said base frame and said interface frame are chosen from the group comprising: metal, plastic, and composite.

19. The hinge apparatus of claim 1, wherein said electro-mechanical system is a boiler.

20. The hinge apparatus of claim 1, wherein said electro-mechanical system is a hot water heater.

* * * * *